(12) United States Patent
Jarvis

(10) Patent No.: US 10,367,759 B2
(45) Date of Patent: *Jul. 30, 2019

(54) ADAPTIVE SPEED DATA COLLECTION

(71) Applicant: Root Wireless, Inc., Bellevue, WA (US)

(72) Inventor: John Jarvis, Newcastle, WA (US)

(73) Assignee: Root Wireless, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,372

(22) Filed: Apr. 19, 2017

(65) Prior Publication Data

US 2017/0222952 A1    Aug. 3, 2017

Related U.S. Application Data

(63) Continuation of application No. 14/866,121, filed on Sep. 25, 2015, now Pat. No. 9,641,264.

(51) Int. Cl.
*H04L 12/24* (2006.01)
*H04L 12/26* (2006.01)
(Continued)

(52) U.S. Cl.
CPC ......... *H04L 49/205* (2013.01); *H04B 17/309* (2015.01); *H04L 41/0681* (2013.01);
(Continued)

(58) Field of Classification Search
CPC ............. H04L 41/5067; H04L 41/5009; H04L 43/0852; H04L 67/1097; H04L 41/00; H04L 41/0836; H04L 41/50; H04L 41/5022; H04L 43/0829; H04L 43/0847; H04L 47/10; H04L 47/11; H04L 47/14; H04W 48/16; H04W 52/0251; H04W 24/00; H04W 24/08; H04W 24/10;
(Continued)

(56) References Cited

U.S. PATENT DOCUMENTS 6,675,203 B1   1/2004  Herrod et al.
8,578,020 B2   11/2013 Van Den Bogaert et al.
(Continued)

OTHER PUBLICATIONS

International Search Report, dated Dec. 19, 2016, for International Application No. PCT/US2016/053451, 4 pages.

*Primary Examiner* — Golam Sorowar
(74) *Attorney, Agent, or Firm* — Seed Intellectual Property Law Group LLP

(57) ABSTRACT

A mobile device is arranged to perform an adaptive speed data collection method. A host application running on the mobile device cooperates with a background service also running on the mobile device. The background service is arranged as a state machine. On each pass through the state machine, quality of service (QoS) data associated with a particular wide area network, such as a cellular network, is collected. Also on each pass through the state machine, a sample time value is calculated based on a plurality of asserted triggers and rules applied to the asserted triggers. An alarm is loaded with the sample time value, and the background service is suspended until the alarm expires or an interrupt is asserted. The asserted interrupt begins a new sequential pass through the state machine.

13 Claims, 10 Drawing Sheets

(51) Int. Cl.
    *H04L 12/28* (2006.01)
    *H04L 29/06* (2006.01)
    *H04W 24/08* (2009.01)
    *H04W 24/10* (2009.01)
    *H04B 17/309* (2015.01)
    *H04L 12/931* (2013.01)
    *H04W 40/00* (2009.01)

(52) U.S. Cl.
    CPC ............ *H04L 43/024* (2013.01); *H04L 65/80* (2013.01); *H04L 12/2854* (2013.01); *H04L 69/28* (2013.01); *H04W 24/08* (2013.01); *H04W 24/10* (2013.01)

(58) Field of Classification Search
    CPC ............. H04W 28/02; H04W 36/0022; H04W 52/0212; H04W 52/0216; H04W 52/0225; H04W 52/0258; H04W 72/1252; H04W 72/1284; H04W 76/00; H04W 76/16; H04W 88/02
    See application file for complete search history.

(56) References Cited

U.S. PATENT DOCUMENTS

| | | | |
|---|---|---|---|
| 2006/0217116 A1 | 9/2006 | Cassett et al. | |
| 2006/0280151 A1* | 12/2006 | Sawada | H04W 72/1252 370/338 |
| 2008/0056125 A1* | 3/2008 | Kneckt | H04L 41/00 370/229 |
| 2010/0269044 A1* | 10/2010 | Ivanyi | G06Q 30/02 715/736 |
| 2012/0208562 A1 | 8/2012 | Wilkin et al. | |
| 2013/0204999 A1 | 8/2013 | Lindberg | |
| 2013/0232261 A1* | 9/2013 | Wright | H04L 41/50 709/224 |
| 2013/0237157 A1* | 9/2013 | Phan | H04W 24/00 455/67.11 |
| 2014/0092733 A1* | 4/2014 | Johansson | H04W 52/0216 370/230 |
| 2015/0023184 A1* | 1/2015 | Cili | H04W 24/08 370/252 |
| 2015/0195788 A1* | 7/2015 | Au | H04W 52/0251 370/311 |
| 2015/0293782 A1* | 10/2015 | Shida | G06F 9/485 719/320 |
| 2015/0326455 A1* | 11/2015 | Hui | G06F 3/0481 715/736 |
| 2016/0057676 A1* | 2/2016 | White | H04W 36/0022 370/333 |
| 2016/0134561 A1* | 5/2016 | Jacoby | H04L 47/805 709/223 |

\* cited by examiner

| Parameter | Trigger Event | Trigger Definitions |
|---|---|---|
| Cell ID | Any Change | CID, BaseStationID |
| Call State | Any Change | Idle, Ringing, Off-Hook |
| Network Type | Any Change | Unknown, GPRS, EDGE, UMTS, CDMA, EVDO_0, EVDO_A, EVDO_B, 1xRTT, HSDPA, HSUPA, HSPA, IDEN, LTE, EHRPD, HSPAP, 802.11ac, 802.11b/g/n |
| Connection Type | Any Change | Unknown, GPRS, EDGE, WiFi, |
| Signal Stength | Change Greater Than 10 DBM | { Reported by Transceiver } |
| Movement | Any Movement | { Reported by GPS } |
| Teleport | Zero Velocity Movement | { GPS Position Changes Between State Controller Cycles } |
| Screen On | Revert Controller to Initialize Rule | { Revert Controller to Initialize Rule } |

Table 1: Trigger Definitions

*Fig. 5A*

| Independent Triggers | | When a Trigger Has Changed | | When No Triggers Have Changed |
|---|---|---|---|---|
| Initialize | 10 Seconds | Variable | 50/Speed | Increase | +10 Seconds |
| | | Decrease | Set to Lowest Sample Time | | |
| Reboot | 10 Seconds | Hold | No Change | Static | x 4 Seconds |
| | | Teleport | Set to Lowest Sample Time | | |

Table 2 : Rule Definitions

*Fig. 5B*

| Sample Parameters | | |
|---|---|---|
| AirplaneMode | ConnectionState | GsmSignalBar | NetworkOperatorName |
| BatteryHealth | ConnectionType | GsmSignalDbm | NetworkRoaming |
| BatteryLevel | DataActivity | GsmSignalStrength | NetworkTypes |
| BatteryPluggedState | DataState | InService | OemRatType |
| BatteryPresent | DataType | Latitude | OperatorCountry |
| BatteryStatus | EvdoDbm | Longitude | OperatorName |
| BatteryTemperature | EvdoEcIo | LteCqi | PhoneStateValues |
| BatteryVoltage | EvdoSignalBar | LteRsrp | PhoneType |
| CallState | EvdoSnr | LteRsrq | SampleID |
| CdmaBSID | FixQuality | LteRssi | SampleNotes |
| CdmaBSlatitude | FlashBlocksFree | LteRssnr | SampleTime |
| CdmaBSlongitude | FlashBlocksTotal | LteSignalStrength | SatelliteCount |
| CdmaDbm | GpsAccuracy | LteSnr | SessionID |
| CdmaEcIo | GpsSpeed | NeighboringCellInfo | SimOperator |
| CdmaNetID | GsmAsu | NeighboringCID | SimOperatorName |
| CdmaSysID | GsmBer | NeighboringLAC | TimeZone |
| CellularSignalStrength | GsmCid | NeighboringNetworkType | TowerID |
| ConnectionIsFailover | GsmEcNo | NeighboringPSC | WifiRssi |
| ConnectionIsRoaming | GsmLAC | NeighboringRSSI | WifiRssiLevel |
| ConnectionNoConnectivity | GsmOemBitErrorRate | NetworkCarrier | WifiSSID |
| ConnectionReason | GsmOemSignalStrength | NetworkOperator | |

Table 3 : Sampled Parameters

*Fig. 5C*

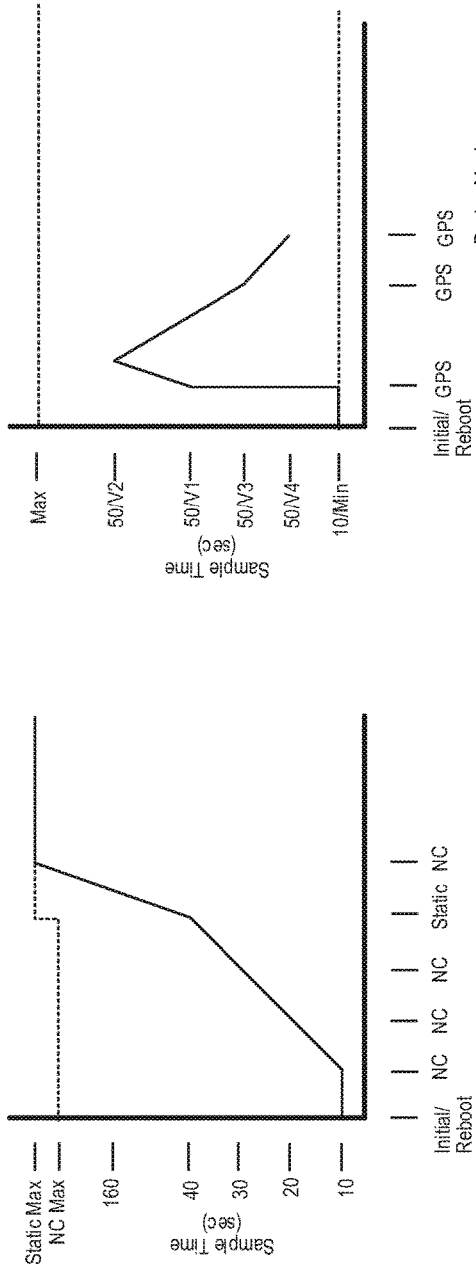
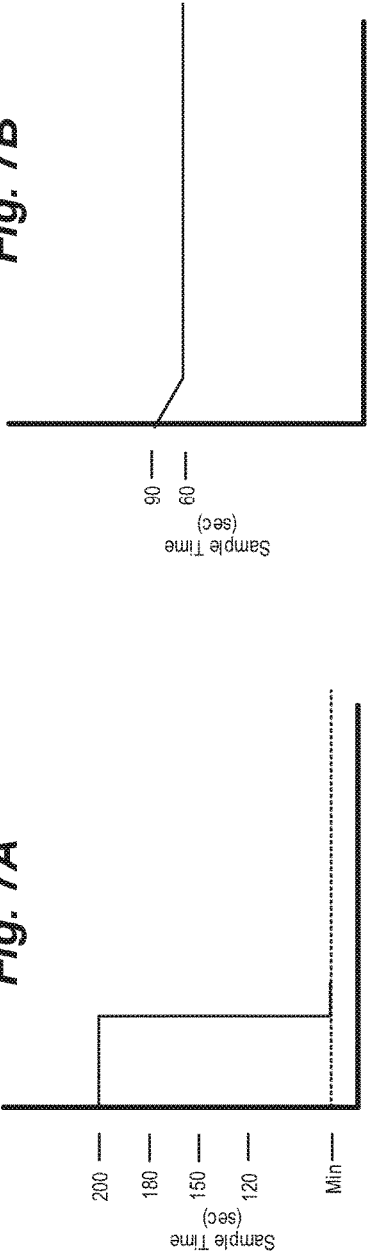
Fig. 7A
Fig. 7B
Fig. 7C
Fig. 7D

ADAPTIVE SPEED DATA COLLECTION

CROSS-REFERENCE TO RELATED APPLICATION

This application is a continuation of U.S. application Ser. No. 14/866,121, filed Sep. 25, 2015, and entitled ADAPTIVE SPEED DATA COLLECTION, which is hereby incorporated by reference in its entirety.

BACKGROUND

Technical Field

The present disclosure generally relates to quality of service data collection by a mobile device operating in a wide area network. More particularly, but not exclusively, the present disclosure relates to a background service executing on a mobile device operating in a cellular network wherein the background service is dynamically adapting its data collection tasks to changing network and device conditions.

Description of the Related Art

Mobile devices have been used to capture quality of service data for many years. U.S. Pat. No. 8,160,571 (the '571 patent), issued to the same assignee as the present application, describes software that executes on a mobile device to collect realistic and accurate user quality information. The techniques and mechanisms described in the '571 patent describe data collection techniques designed to limit the degradation of user experience of the mobile device during the data collection process. The '571 patent software operates as a background application, which, in some cases, also includes a user interface, and the software may also be remotely controlled and updated by an external server. U.S. Pat. No. 8,832,258 (the '258 patent), also issued to the same assignee as the present application, describes an external server embodiment that directs a mobile device to collect and communicate realistic and accurate user quality information according to one or more data collection rule sets. The computing server or a data collection server receives, filters, and stores the user quality information provided by the mobile device. Both the '571 patent and the '258 patent are incorporated herein by reference.

FIG. 1 illustrates a known network data collection environment 1. In the environment 1, a first mobile device 2a is operating somewhere within a coverage area 4 of a wide area network 6 (e.g., a cellular network). Other mobile devices 2b, 2c, 2d, . . . 2n are also operating within the coverage area 4 of the wide area network 6. The mobile devices 2a-2n are typically associated with ordinary users. The ordinary users may sign respective contracts for access to voice, data, short message service (SMS) text messages, and other services with a network service provider that administers such services in the wide area network 6. In conjunction with the signed contract, the mobile devices 2a-2n associated with the ordinary users are provisioned for access to the contracted services. Each user may then use their associated mobile device whenever they are within the coverage area 4.

Coverage area 4 illustrates some or all of the areas where wide area network services are offered by a network service provider. Urban areas such as in buildings and streets of a city, suburban areas with residential and light commercial areas, forest areas, mountainous areas, rural areas, highways, streets, and roads are all represented in one form or another in the coverage area 4 serviced by the wide area network 6. The mobile devices, including mobile device 2a, may move in any direction and at any speed within the coverage area 4, and as the mobile devices move, a quality of service (QoS) software application is executing on each mobile device. The QoS software application collects data associated with the wide area network 6.

The QoS software application running on each mobile device may operate autonomously, or the QoS software application may take direction from a particular computing server 8. The computing server 8 includes a data collection portion 8a, and the same or another computing server 8 includes a data control portion 8b. The data control portion 8b directs operations of the QoS software application, and the data collection portion 8a receives QoS data collected by each of the mobile devices 2a-2n.

As described in the '571 patent and the '258 patent, wide area network may be any wireless network that conforms to a particular protocol. Mobile devices as described herein can collect data from cellular networks that conform to a 3G protocol, a 4G protocol, a 5G protocol, or some other wireless communication network protocol.

Mobile device 2a is illustrated in FIG. 1 with a schedule-based testing methodology 10 illustrated as a flowchart. In FIG. 1, the testing methodology 10 begins at 12 with an inquiry as to whether the device is active or inactive. Since mobile device 2a is a mobile device carried by an ordinary user, the mobile device 2a may be in current use by the user, or the mobile device 2a may be sitting idle in an inactive sleep mode. If mobile device 2a is active, the user may be in a telephone call, passing data across the wide area network 6 (e.g., Internet search, email, gaming, multimedia streaming, and the like), sending a text message, or performing some other function. When mobile device 2a is active at 12, processing falls to 18. Alternatively, when mobile device 2a is inactive at 12, processing falls to the inquiry at 14.

At 14, if a determined amount of time has not yet elapsed, processing will return to the inquiry at 12. In this case, mobile device 2a will return to an inactive sleep mode at 20 or some other mode that was previously in operation prior to the processing at inquiry 12. Alternatively at 14, if the determined amount of time has elapsed, processing will pass to the functions at 16.

At 16, a particular test "N" is performed. In the known embodiment of FIG. 1, mobile device 2a is configured to perform one of three particular tests for each pass through the testing algorithm. The test that is performed may be a data test, a call test, a short message service (SMS) test, or some other test.

In the function processing at 16, "N" is a variable, and with each pass through the algorithm, the variable N is incremented modulo 3. Accordingly, in sequential passes through the algorithm, the variable N will take the value 0, 1, and 2, and one of the three tests will be performed.

A first test that may be performed in the functional processing at 16 may be a data test. The data test may last for a predetermined time such as 30 seconds. The data test is arranged to send and receive test data across the wide area network 6 to and from the data control portion 8b of computing server 8. Mobile device 2a will collect results of the data test, which may include the time it takes for test data to traverse the network in one direction, the other direction, or both directions. Lost packets of test data are noted, and the order in which packets are delivered may also be noted. Data packet routing may be tracked and recorded along with other aspects of data communication through wide area network 6.

A second test that may be performed in the functional processing at 16 may be a phone call test. In a phone call test, one or more test telephone calls may be initiated and maintained from mobile device 2a through wide area network 6 to the data control portion 8b of computing server 8. Dropped calls are recorded, along with the inability to make calls. Other recorded aspects of the call test may include capturing and recording network routing information, cell tower information, backbone infrastructure information, and the like.

A short message service (SMS) test is another test that may be performed in the functional processing at 16. In an SMS test, one or more text messages are sent between mobile 2a and the data control server portion 8b during a 30 second period. The ability to send and receive the text messages, along with other quality aspects associated with text messages, such as the speed of a message through the network, the ability to pass a text message through the network, and any errors in the text message data may also be recorded.

The functional processing at 16 may take a predetermined amount of time, and the testing is arranged to terminate if the user begins to use mobile device 2a.

In cooperation with functional processing at 16, or if the device was determined to be active at 12, QoS data associated with mobile device 2a and the wide area network 6 is captured at 18. The captured QoS data may be any of the data as indicated herein with respect to particular tests, and the same or similar QoS data may be captured when mobile device 2a is in active use by the user. For example, if the user is engaged in a telephone call and the telephone call is dropped, the testing algorithm may capture a record of the dropped call. In a similar way, other anonymous information associated with quality of service may be captured when the user uses mobile device 2a.

In association with the functional tests at 16 and the captured data at 18, a location of the mobile device 2a within the coverage area 4 and a timestamp is associated with each datum of the captured data. Processing at 18 ends and mobile device 2a is put into an inactive sleep mode or another mode that the device was previously in at 20. Processing returns to the inquiry at 12.

Generally speaking, the test methodology 10 illustrated in FIG. 1 with respect to mobile device 2a is a schedule-based QoS data collection methodology. When mobile device 2a is not in active use by a user, the device will wake on a predetermined schedule to perform a test, and then the device will go back to a sleep state. The amount of time that mobile device 2a remains in a sleep state before being woken to perform another test may be several seconds, several minutes, or some other amount of time. The regular collection of data in this way allows mobile device 2a to collect a large amount of data on a very regularly scheduled basis.

On a periodic, scheduled, or some other basis, data captured by mobile device 2a is passed through the wide area network 6 to the data collection portion 8a of computing server 8.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The use of conventional tools and methodologies to collect quality of service (QoS) data associated with a wide area network, such as a cellular network, has led to the discovery of a significant drawback with the conventional approach. Conventional QoS data collection has heretofore been followed an inefficient schedule-based process. The collection of QoS data would run on a predictable, periodic schedule that would consume battery power and processor cycles even when it was known in advance that the QoS data likely to be collected would be redundant or otherwise less valuable.

Using the adaptive speed data collection (ASDC) tools and methodologies described in the present disclosure, the amount of battery power consumed and the number of processor cycles expended in the collection of QoS data is reduced. The time duration between consecutive acts to collect QoS may be adapted each time such data is collected. One or more triggers are analyzed and if certain rule conditions applied to the triggers are met, the time duration is adjusted upwards or downwards. In this way, the amount of time that passes between one QoS data collection act and a subsequent QoS data collection act may be different than the amount of time that passes between two other QoS data collection acts.

An adaptive speed data collection method may be summarized as including initializing a background service on a mobile device, the background service arranged as a state machine; collecting quality of service (QoS) data with the mobile device, the QoS data associated with a certain wide area network; determining, with the mobile device, a sample time value based on asserted triggers and rules applied to the asserted triggers; loading an alarm with the sample time value; and suspending operation of the background service until the alarm is activated.

The adaptive speed data collection method may further include: receiving a plurality of current input variables from a source outside of the background service; retrieving a plurality of previous input variables; comparing ones of the plurality of current input variables with corresponding ones of the plurality of previous input variables; forming the asserted triggers based on the comparing; and storing the plurality of current input variables in corresponding memory locations occupied by the plurality of previous input variables, wherein the plurality of current input variables are treated as the plurality of previous input variables in a subsequent cycle of the state machine.

The adaptive speed data collection method may further include: modifying the sample time value based on the application of at least one rule to at least one asserted trigger.

The adaptive speed data collection method may further include: executing at least two sequential passes through the state machine, the two sequential passes separated by a time duration associated with the sample time value. The asserted triggers may include at least one of a cell identifier, a call state, a network type, and a connection type.

The adaptive speed data collection method may further include: modifying the sample time value based on any change to at least one of the cell identifier, call state, network type, or connection type. The asserted triggers may include at least one of a signal strength value, a mobile device movement value, a mobile device user activity value, and a screen-on value.

The adaptive speed data collection method may further include: modifying the sample time value based on a change in signal strength that exceeds a predetermined power ratio value; or modifying the sample time value based on an absence of movement of the mobile device; or modifying the sample time value based on a user activity of the mobile device; or modifying the sample time value based on a change in screen state of the mobile device. The sample time value may be increased by a first amount based on the absence of movement of the mobile device. The sample time value may be increased by a second amount based on a continued absence of movement of the mobile device during at least two sequential passes through the state machine, the second amount being larger than the first amount.

A mobile device may be summarized as including: a processing unit; a memory having stored thereon a first set of software instructions executable by the processing unit, the first set of software instructions organized as a host application, and a second set of software instructions executable by the processing unit, the second set of software instructions organized as a background service; an input interface to pass input variables from the memory to the background service; and at least one timer, the at least one timer configured to receive a sample time value, the at least one timer configured to interrupt the processing unit when a time duration corresponding to the sample time value expires, wherein the second set of software instructions organized as the background service direct the processing unit to: collect quality of service (QoS) data associated with a certain wide area network; determine a sample time value based on asserted triggers and rules applied to the asserted triggers; load the at least one timer with the sample time value; and suspend operation of the background service until the at least one timer interrupts the processing unit when the time duration corresponding to the sample time value expires.

The mobile device may further include: a transceiver to send the collected QoS data to a remote data collection server. The transceiver may be configured to receive control information from a remote data control server, the control information arranged to modify the rules applied to asserted triggers. The first set of software instructions organized as the host application may configure the processing unit to direct operations of the second set of software instructions organized as the background service. The mobile device may further include: a user interface, the user interface arranged to present information representing at least some of the collected QoS data in cooperation with the first set of software instructions organized as the host application.

A non-transitory computer-readable storage medium whose stored contents configure a computing system to perform a method may be summarized as including: instantiating an adaptive speed data collection (ASDC) software application; instantiating an ASDC background service, the ASDC background service arranged to cooperate with the ASDC software application; collecting quality of service (QoS) data via the ASDC background service, the QoS data associated with a certain wide area network; determining a sample time value based on asserted triggers and rules applied to the asserted triggers; loading an alarm with the sample time value; and suspending operation of the ASDC background service until the alarm is activated.

The non-transitory computer-readable storage medium whose stored contents configure the computing system to perform the method, the method may further include: executing a plurality of sequential passes through the ASDC background service, each sequential pass separated by a duration of time represented by the sample time value, wherein the sample time value is changeable during each sequential pass. The non-transitory computer-readable storage medium whose stored contents configure the computing system to perform the method, the method may further include: continuing to execute the plurality of sequential passes through the ASDC background service when operations of the adaptive speed data collection (ASDC) software application end. The non-transitory computer-readable storage medium whose stored contents configure the computing system to perform the method, the method may further include: increasing the sample time value by a first amount based on an absence of movement of a mobile device associated with the computing system; and increasing the sample time value by a second amount based on a continued absence of movement of the mobile device during at least two sequential passes through the ASDC background service, the second amount being larger than the first amount. The non-transitory computer-readable storage medium whose stored contents configure the computing system to perform the method, the method may further include: communicating collected QoS data to a remote data collection server.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 5A is a representative embodiment of trigger definitions (Table 1);

FIG. 5B is a representative embodiment of rule definitions (Table 2);

FIG. 5C is a representative embodiment of sampled parameters (Table 3);

FIG. 7A is a representative graph of sample time changing under a no-triggers condition;

FIG. 7B is a representative graph of sample time changing when a mobile device is in a device-moving condition;

FIG. 7C is a representative graph of sample time changing under a trigger-activated condition;

FIG. 7D is a representative graph of sample time held fixed under a hold condition.

DETAILED DESCRIPTION

Figure 1:
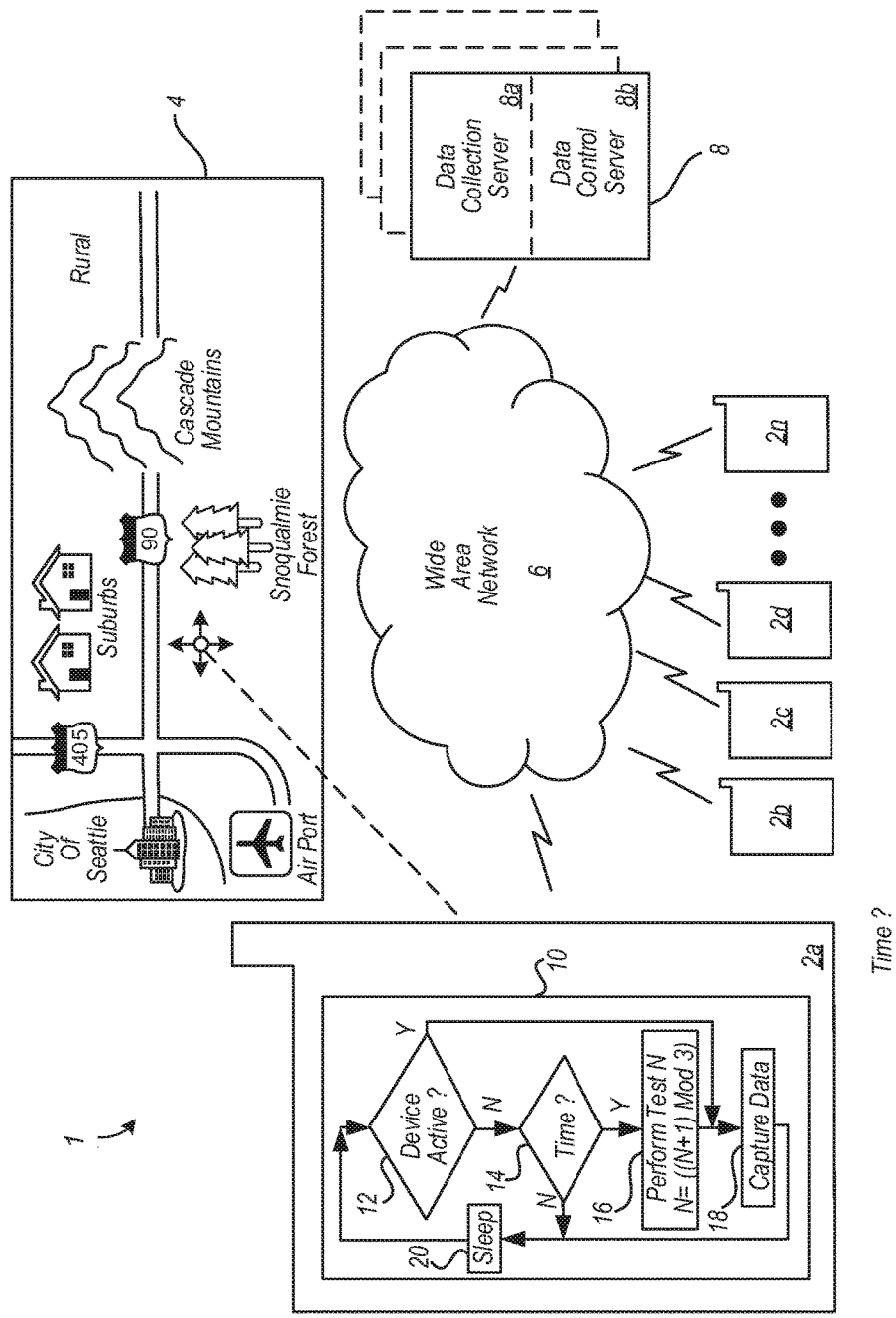
FIG. 1 illustrates a known network data collection environment

The disclosure herein describes processes, machines, and articles of manufacture that service vast multitudes of users and improve the functioning of wide area networks such as cellular systems where embodiments of the processes, machines, and articles of manufacture are operating or otherwise in use. When using these devices, network service providers can add value to their existing offerings by analyzing quality of service (QoS) data collected by the devices. With respect to coverage area 4 of FIG. 1, it is known that buildings, trees, mountains, and other man-made structures and naturally occurring terrain features affect the quality of service in a wide area network. Accordingly, when QoS data is captured by typical mobile devices of ordinary users using their devices according to arm's-length contracts for mobile network services, the data is very valuable. The captured data, particularly when it is aggregated with captured data from a plurality of user devices, may identify weak points in the wide area network 6, failing or otherwise inadequate network infrastructure, an over-abundance of network infrastructure, and a large number of other issues directly associated with the wide area network 6.

It is known that the users of mobile devices place value on the length of time that their mobile device can operate on a single battery charge. It is also known that the number of times a battery is charged and discharged may be correlated to the length of time that a battery may be used before it fails. It is further known that charging batteries requires energy, and the conservation of energy is an important economic and ecological issue. Along these lines, the collection of valuable QoS data is improved when the collecting of such data is made more energy efficient.

It has been recognized by the inventor that known systems for collecting QoS data can be improved by replacing a schedule-based QoS data collection methodology with an adaptive speed data collection methodology.

The testing algorithm that executes in mobile device 2a (FIG. 1) implements a schedule-based data collection method. When mobile device 2a is not in active use, the method follows a sequential sleep-test-sleep pattern. The device will wake from a sleep state, perform a test, and return to a sleep state on a predictable, regular schedule, this pattern continues even if the device is stationary within the coverage area for a very long time.

The value of collected QoS data is diminished when known data is collected over and over again even though conditions commensurate with the testing have not changed. This is a likely circumstance when a user places a mobile device on a nightstand after work every day, when a user places their mobile device on a desk or table as they work all day, and in many other circumstances. If the mobile device operates according to the test methodology 10 described with respect to FIG. 1, a large volume of generally unchanging QoS data will be collected. Accordingly, benefits are accrued if the collection of such a large volume of known, unchanging QoS data can be avoided.

Figure 2:
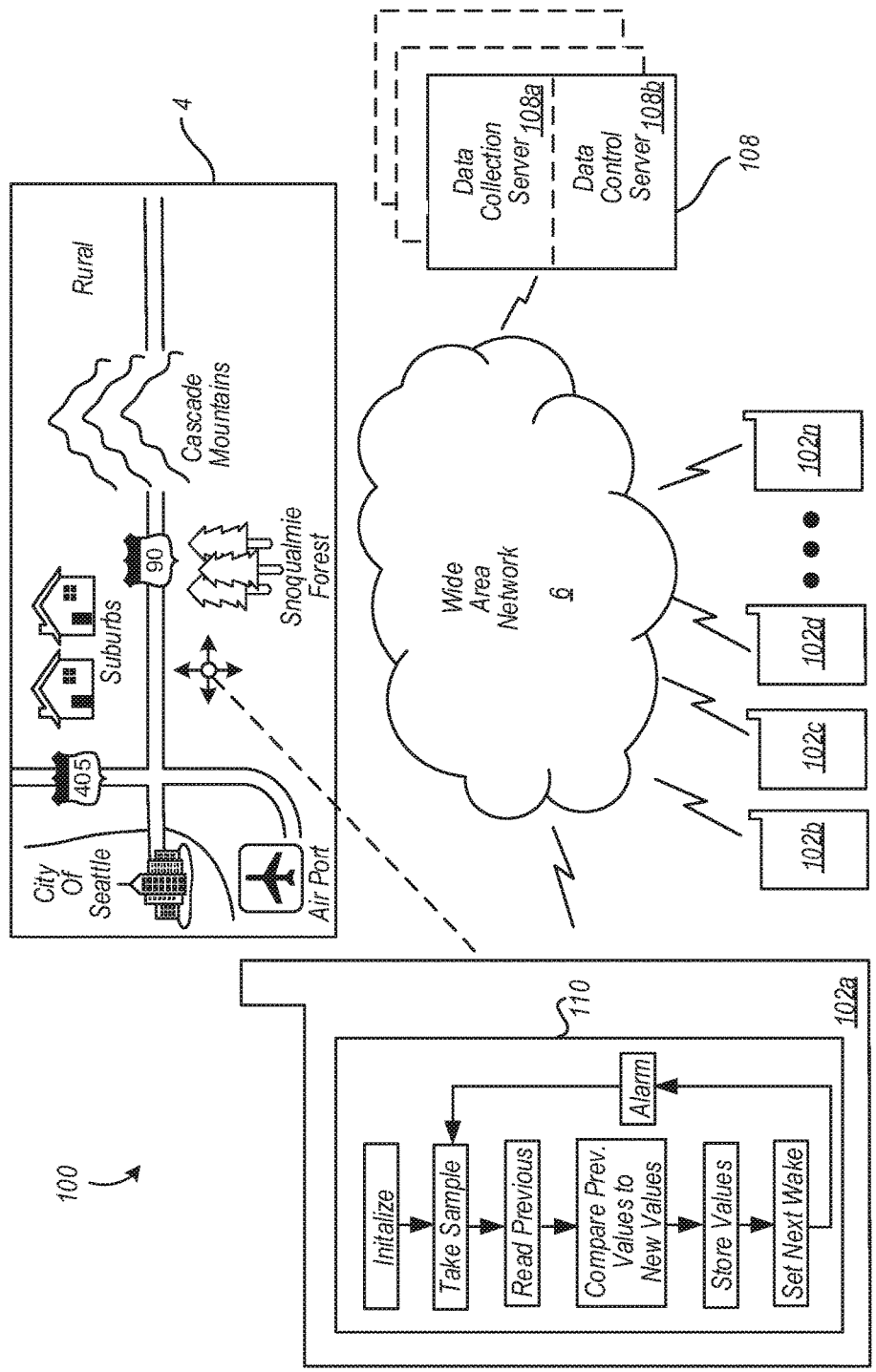
FIG. 2 illustrates a network data collection environment in which mobile device embodiments employ an adaptive speed data collection methodology.

FIG. 2 illustrates a network data collection environment 100 in which mobile device embodiments employ an adaptive speed data collection test methodology 110. In FIG. 2, just as in FIG. 1, the wide area network 6 provides wireless network services in a coverage area 4. Within the coverage area, a vast multitude (e.g., dozens, hundreds, thousands, or millions) of mobile devices 102a-102n are carried by users in cities, suburbs, rural areas, mountains, forests, and still other mobile devices 102a-102n are deployed in other ways such as in vehicles, in industrial equipment, in buildings, and in other ways. The mobile devices 102a-102n are provisioned to access mobile network services for making phone calls, surfing the Internet and passing other data traffic, sending and receiving SMS messages, location tracking, and the like.

Valuable data can be collected by mobile device 102a-102n regarding the quality of service provided in the coverage area 4 via the wide area network 6. In contrast to FIG. 1, however, mobile devices 102a-102n introduced in FIG. 2 are not configured to implement a schedule-based data collection method; instead, mobile device 102a-102n are configured to implement an adaptive speed data collection test methodology 110.

Figure 3:
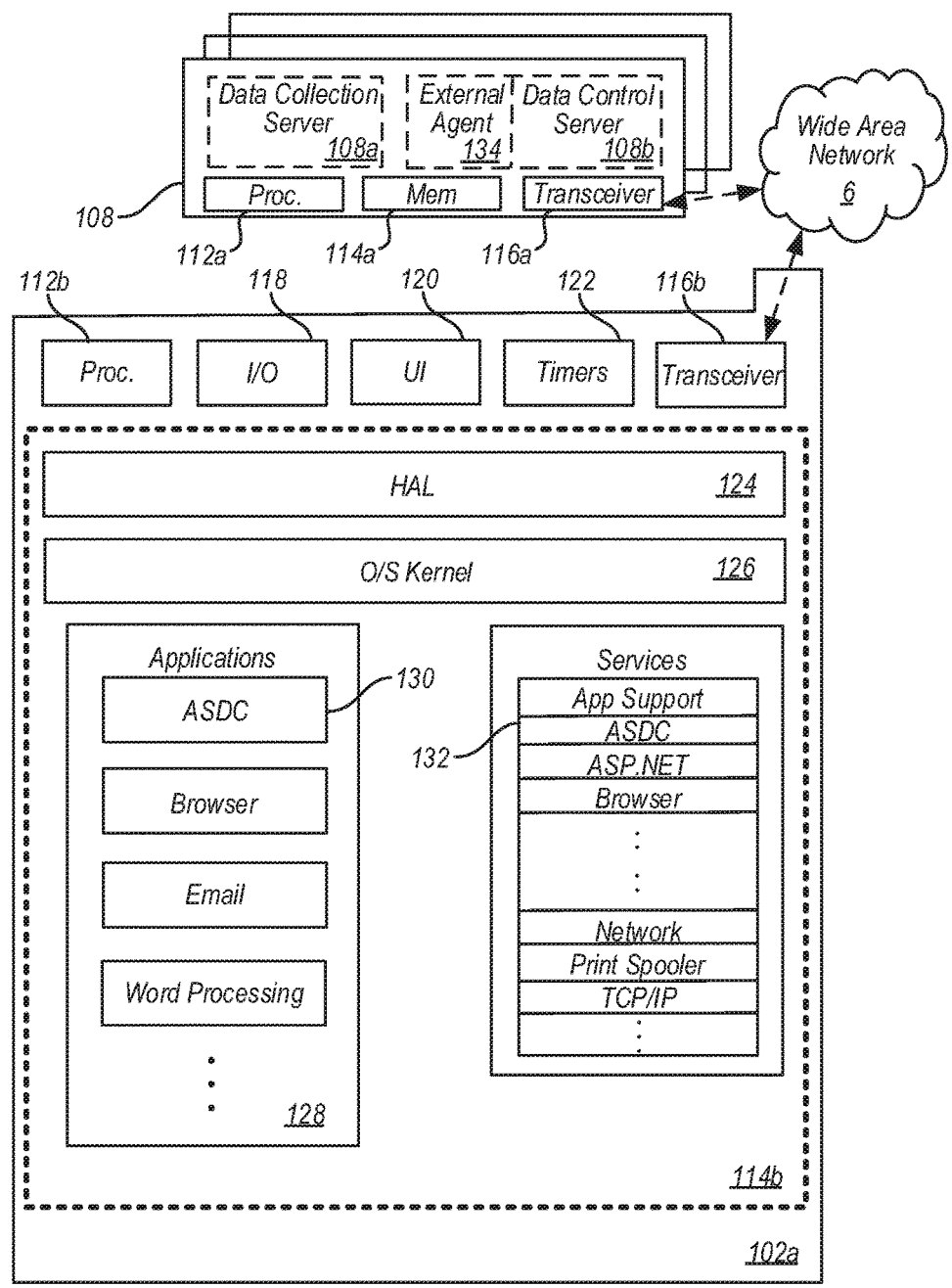
FIG. 3 illustrates a particular mobile device embodiment in more detail along with a computing server.

FIG. 3 illustrates a particular mobile device 102a embodiment in more detail along with a computing server 108. Computing server 108 is arranged to collect QoS data from, and to pass control information to and from, a plurality of mobile devices including mobile device 102a. Accordingly, computing server 108 may direct and otherwise support operations of an adaptive speed data collection methodology.

Computing server 108 includes a data collection server portion 108a and a data control server portion 108b. The data collection server portion 108a and a data control server portion 108b may be separate and distinct from each other, or the portions may cooperatively share resources of a single computing server. In some embodiments, the data control server portion 108b includes an optional external agent 134. Computing server 108 may be formed as a single computing machine, a plurality of computing machines, or in some other arrangement, such as a cloud-based distributed computing machine.

Computing server 108 includes operative hardware found in a conventional computing server apparatus such as one or more processing units 112a, volatile and non-volatile memory logic 114a, and wired and/or wireless networking circuitry (e.g., a communications transceiver 116a) compliant with various standards and protocols. Computing server 108 further includes operative software found in a conventional computing server such as an operating system, software drivers to direct operations through I/O circuitry, networking circuitry, and other peripheral component circuitry. In addition, computing server 108 includes operative application software such as network software for communicating with other computing devices, database software for building and maintaining databases, and task management software for distributing the communication and/or operational workload amongst various CPU's. The conventional hardware and software of computing server 108 is not shown in FIG. 3 for simplicity.

Mobile devices such as mobile device 102a include a processing unit 112b, memory logic 114b, a transceiver 116b, input/output (I/O) logic 118, a user interface 120, and one or more timers 122. Transceiver 116b may include one transceiver or a plurality of transceivers. Transceiver 116b may include a personal area network (PAN) transceiver (e.g., Bluetooth, near-field controller (NFC)), a local area network (LAN) transceiver (e.g., Ethernet, WiFi), a wide area network (WAN) transceiver (e.g., cellular, satellite), or some other transceiver. In one case, for example, transceiver 116b may include a cellular transceiver to couple mobile device 102a-102n to other communication devices through wide area network 6. In some cases, software and data in memory logic 114b are communicated between mobile device 102a-102n and computing server 108 via the cellular transceiver 116b. That is, bidirectional communication between mobile device 102a-102n and a computing server 108 is facilitated by the cellular transceiver 116b. In these and other cases, computing server 108 may download a new or updated version of ASDC software (i.e., ASDC software application 130, ASDC background service 132, and the like) to the mobile device 102a-102n over the wide area network 6. Mobile devices 102a-102n can communicate QoS measurement data stored in memory logic 114b to the computing server 108 over the wide area network 6.

Configured within the memory logic 114b, a hardware abstraction layer 124 provides a software-based interface between an operating system (O/S) 126 and circuitry of the mobile device (i.e., processing unit 112b, I/O logic 118, and the like).

A plurality of user mode software applications 128 are illustrated as stored in memory logic 114b including an adaptive speed data collection (ASDC) software application 130. An Internet browser, an electronic mail (email) client, and a word processing tool are also illustrated, but one of skill in the art will recognize that a plurality of other software applications may also be stored in the memory logic 114b. The user mode software applications include a plurality of software instructions executable by the processing unit 112b, and each software application may include storage space in memory logic 114b for dedicated data, global data, shared data, and other types of designated data. User mode software applications 128 may or may not be arranged to communicate information through the I/O logic 118 and user interface 120, and the applications may in some cases communicate data through the wide area network 6 (FIG. 2) via transceiver 116b.

Background services, which are administered by the 0/S 126, are also stored in memory logic 114b. A few such services are illustrated, and one of skill in the art will recognize that many more services are generally operating in a mobile device. One background service that is operating in mobile device 102a and other such devices is an adaptive speed data collection (ASDC) background service 132. The ASDC software application 130 and the ASDC background service 132 cooperate to carry out the operations of the adaptive speed data collection (ASDC) test methodology 110. In some embodiments, operations of one or both of the ASDC software application 130 and the ASDC background service 132 further cooperate with an optional external agent 134 embodied in computing server 108.

Compared to a schedule-based data collection function, the ASDC background service 132 collects data from a mobile device 102a-102n with a lower performance impact to the respective mobile device. The ASDC background service 132 provides a reduced impact on battery consumption and processor usage because the ASDC background service 132 dynamically adjusts a time-duration between each instance of data sample collection. What's more, the ASDC background service 132 is flexibly controllable from within the ASDC software application 130 and in addition, or in the alternative, the ASDC background service 132 is flexibly controllable from an optional external agent 134 resident in the control portion 108b of the computing server 108.

The ASDC background service 132 may be configured to continue collecting QoS data when the ASDC software application 130 is not in the foreground and even when the ASDC software application 130 is not loaded in active memory. This configuration also provides a benefit of reduced power consumption and reduced impact on processor usage.

Figure 4:
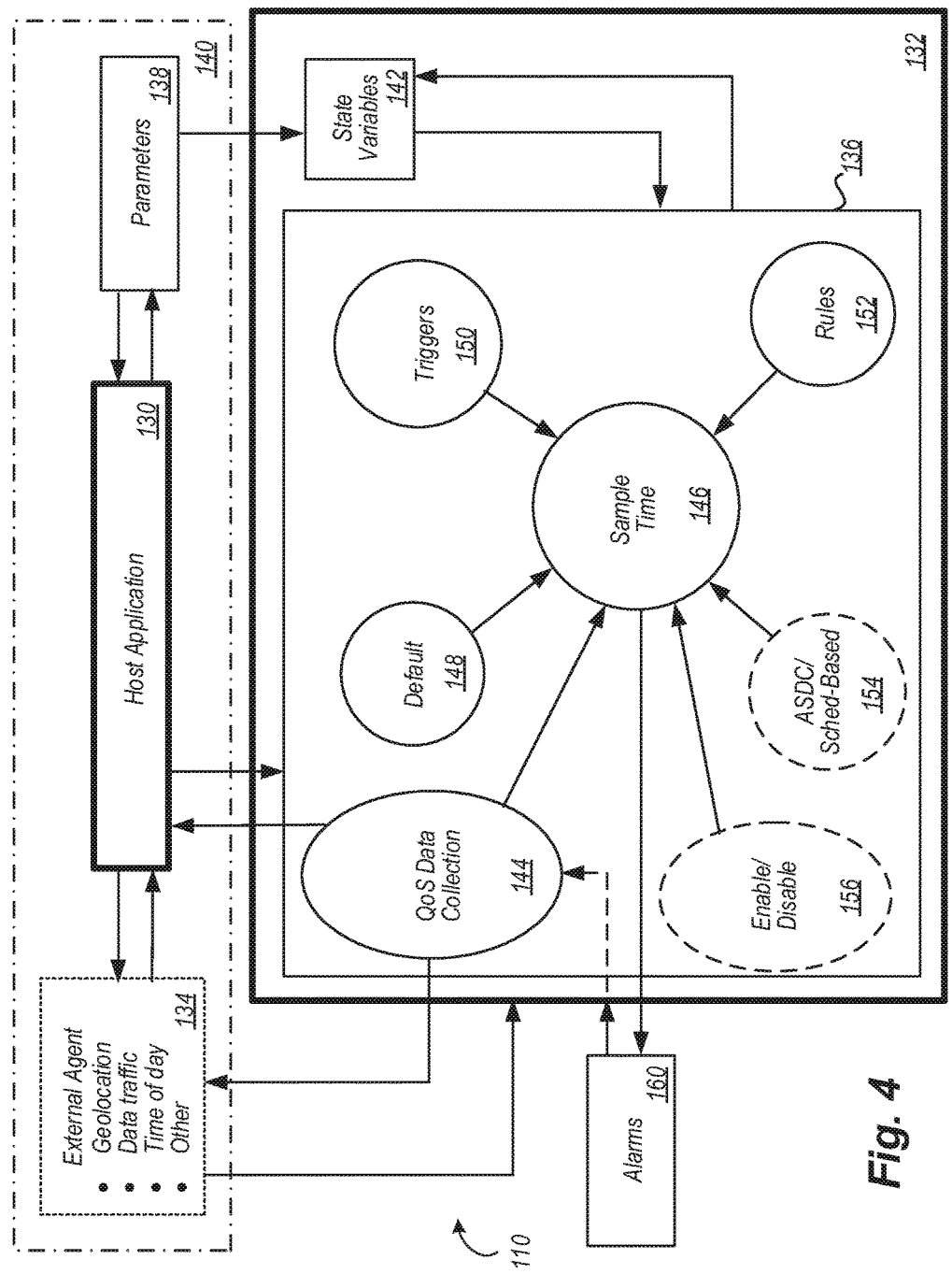
FIG. 4 is a block diagram of the ASDC test methodology of FIG. 1 in more detail.

FIG. 4 is a block diagram of the ASDC test methodology 110 of FIG. 1 in more detail. The ASDC software application 130 and ASDC background service 132 are prominently featured. The ASDC background service 132 implemented in FIG. 4 includes a simple state controller 136 that calculates a desired sample time based on external parameters 138. Each time state controller 136 executes, at least one QoS data sample is collected at 144. In some cases, the QoS data sample is immediately sent back to the data collection portion 108a of computing server 108. In other cases, a plurality of QoS data samples are collected and stored for later communication back to the computing server 108. After the QoS data is collected, state variables 142 are updated, and a new sample time 164 value is calculated. An alarm is set at 160, and the mobile device 102a-102n enters a sleep mode.

Turning to the specific structure illustrated in FIG. 4, the adaptive speed data collection (ASDC) software application 130 works cooperatively with the adaptive speed data collection (ASDC) background service 132. The ASDC software application 130 module includes a set of software instructions stored in memory and other logic to cooperatively couple the application to a plurality of parameters 138 stored as variables, structures, data sets, or the like in memory. The parameters 138 module illustrated in FIG. 4 may include executable software instructions and other logic to collect system data generated or otherwise stored in mobile device 102a-102n. The ASDC software application 130 is also cooperatively coupled with the external agent 134.

External agent 134 is illustrated in a cooperative relationship 140 that includes external agent 134, ASDC software application 130, and parameters 138. These three modules are illustrated in a cooperative relationship 140 because it is understood that some portions or all portions of the modules are stored and executed from the mobile device 102a-102n. Alternatively, at least some portions of the external agent 134 module may be stored and executed from the computing server 108. As discussed herein, the ASDC test methodology 110 collects realistic and accurate QoS data associated with wide area network 6. The collection of such data may be adjusted or controlled based on a geolocation of the associated mobile device 102a-102n, data traffic in a particular portion of coverage area 4 (FIG. 2), time of day, and many other factors. In some cases, these factors are selected, adjusted, or otherwise designated from the computing server 108; in other cases, the factors are administered by mobile device 102a-102n via the ASDC software application 130.

The ASDC background service 132 includes a state controller module 136, a state variables module 142, and a QoS data collection module 144. The state controller 136 can take many forms. Operations of state controller 136 are described in the present disclosure with respect to FIG. 4, and further operations are described with respect to FIGS. 6A and 6B. Yet one more implementation is recognized in the discussion of the ASDC test methodology 110 illustrated in FIG. 2. Accordingly, it is recognized that one of skill in the art will understand how to make and use such a state controller device without departing from the concepts described herein.

When the state controller module 136 begins an iteration sequence, a QoS data collection state 144 operation collects one or a plurality of QoS datums. In steady-state operation, the iteration sequence of the state controller module 136 begins after a timer expires (e.g., timers 122 in FIG. 3) and an alarm interrupt is triggered. In other cases, such as when the ASDC background service 132 is loaded and initialized, the QoS data collection state 144 is entered. In still other cases, the ASDC software application 130 or the external agent 134 may set conditions to begin a state controller module 136 sequence.

The state controller module 136 includes a prominent set-sample-time state 146. When a sequence of the state controller module 136 commences, a QoS data collection state 144 executes, and after the QoS data collection state 144 executes, other states of the state controller module 136 provide input and analysis to the set-sample-time state 146. The set-sample-time state 146 will calculate a sample time, load the sample time into an alarm timer, and then go into a sleep mode. Accordingly, the "sample time" is the amount of time that the ASDC background service 132 will remain asleep, and thus, the "sample time" is also the amount of time that will elapse between one QoS data collection state 144 and another.

To determine the magnitude of a "next sample time," the state controller 138 compares a "fresh" (i.e., current) version of input parameters to a "stale" (i.e., previous) version of the input parameters. Based on the comparisons of the plurality of input parameters, the state variables are updated. After the state variables are updated, the state controller module 136 stores the input parameters and the state variables for the next cycle. Along these lines, the fresh and stale versions of the parameters and the state variables may be stored and retrieved as needed via the external parameters module 138 and the state variables module 142.

The sample time value will be set based on an analysis and one or more calculations using state variable information generated in a plurality of other states. For example, a default state 148 will initialize state variables to default values, will return state variables to known states after state controller 136 has run through a cycle, and provide other initialization information.

A triggers state 150 will specify parameters used to cause the state controller 136 to change the sample time. A rules state 152 will specify the amount of change to the sample time that will occur from updates of the trigger parameters made during the triggers state 150.

Two other optional states are also recognized in the state controller 136 implementation of FIG. 4. An optional ASDC/Schedule-Based state 154 is implemented for backwards compatibility with conventional QoS data collection methodologies. In particular, when the state controller 136 begins a cycle, the ASDC/Schedule-Based state 154 quickly determines whether or not a schedule-based methodology is enabled. If a schedule-based methodology is enabled, execution of the state controller 136 is quickly ended. In some cases, the sample time is set to infinity in the set-sample-time state 146, which prevents the ASDC background service 132 from automatic reactivation. In other cases, the state controller cycle is merely ended. When the ASDC test methodology 110 is enabled, a sample time is calculated using the set-sample-time state 146.

An optional enable/disable state 156 is also implemented in the state controller module 136. In one implementation, the ASDC software application 130 sends a particular command sequence to the ASDC background service, for example via a host operating system's messaging system. In some embodiments, the enable/disable state 156 will remember its enabled or disabled state across device reboots. In these cases, the state controller 136 will retain its previous state information. In other cases, upon a device reboot, the state controller 136 will recognize an "initial start" and a default sample time via default state 148. Subsequent sample times will be calculated in the set-sample-time state 146 using input from the triggers state 150 and rules state 152.

FIG. 5A is a representative embodiment of trigger definitions applied in the trigger state 150 of state controller module 136 of FIG. 4. The trigger definitions in FIG. 5A are presented in a table format and identified as Table 1. A leftmost column of Table 1 identifies eight input parameters, which are associated with the external parameters module 138 of FIG. 4. The eight input parameters in Table 1 are non-limiting. More, fewer, or different input parameters are also considered. For purposes of explanation of the embodiment, a fresh version of each of the parameters is interrogated each time the state controller module 136 begins a sequence. Respective ones of the fresh version are compared with a stale version of the corresponding parameters, and based on the comparison, a set of state variables are updated. The state variables guide particular actions in the state controller module 136 to update the sample time using the set-sample-time state 146. After the fresh/stale input variable comparisons are performed, the fresh version of the input parameters replaces the stale version of corresponding input parameters in the external parameters module 138.

The center column of Table 1 in FIG. 5A identifies particular triggering events associated with each of the input parameters. In effect, the trigger events represent threshold values for determining whether or not the comparison of a fresh input parameter to a stale input parameter will cause action within the state controller module 136 to update the sample time. For example, if any changes to a Cell ID, a Call State, a Network Type, or a Connection Type are detected between two iteration cycles of the state controller 136 module, the detected change will indicate action taken in the state controller module 136 to update the sample time (i.e., the time between QoS data collection operations). In the same way, fresh versions of other parameters in Table 1 are compared to stale versions of corresponding parameters.

The third column of Table 1 in FIG. 5A identifies trigger definitions or other data associated with the particular input parameters. In some cases, the trigger definitions column indicates a range of values that may be taken by the particular parameter; in other cases, the trigger definitions, indicates particular notes that guide the comparison or action to be taken upon a detected change.

The definitions of Table 1 in FIG. 5A are substantially self-explanatory. The "Teleport" parameter is further explained. It is recognized that the time between active cycles of state controller 136 may be very short (e.g., 10 milliseconds) or very long (e.g., several seconds, minutes, or hours). When the time between two consecutive cycles of state controller 136 is long, it is contemplated that a first GPS position is reported on a first cycle and a second, different GPS position is reported on a second cycle, but during each the first and second cycles, the mobile device 102a-102n is stationary. In this way, it would appear to the state controller 136 that the mobile device 102a-102n has "teleported" from one location to another.

One the many ways that a mobile device 102a-102n can appear to teleport is when the mobile device 102a-102n is in an automobile. In this case, if the user is driving in an urban environment, the vehicle may be stopped at a first stoplight when state controller 136 executes one cycle, and the vehicle may be stopped at a second stoplight when state controller 136 executes another cycle. The mobile device GPS in this circumstance would report two different locations, but it would not report any active motion (i.e., zero velocity).

FIG. 5B is a representative embodiment of rule definitions applied in the rules state 152 of the state controller module 136 of FIG. 4. The rule definitions in FIG. 5B are presented in a table format and identified as Table 2. In Table 2, rules are defined for three sets of trigger conditions: 1) independent triggers, 2) when a trigger has changed, and 3) when no triggers have changed.

Turning to the first, leftmost set of trigger conditions (i.e., independent triggers), two rules are defined. In a first rule, whenever the ASDC test methodology 110 initializes, the sample time (i.e., the time between QoS data collection operations) will be set in the state controller module 136 to a default value. The default value illustrated in the non-limiting embodiment of Table 2 is 10 seconds, but other values are also contemplated. In the non-limiting embodiment, 10 seconds is considered a minimum sample time, which means about 10 seconds will elapse between two passes of QoS data collection state 144. In a second rule, whenever the mobile device 102a-102n reboots, the sample time will be set in the state controller module 136 to a default value, which in the embodiment of Table 2 is 10 seconds.

Turning to the center set of trigger conditions (i.e., when a trigger has changed), four particular rules are defined. A first rule is a "variable" change made to the sample time when movement of the mobile device 102a-102n is detected. A non-limiting default value of 50 meters is selected and divided by the detected speed of the mobile device 102a-102n, which is measured in meters per second. The result of the division is a number of seconds by which the sample time will be changed. A second rule will recognize a decrease in a particular input parameter. If such a decrease is detected, then the sample time may be set to a minimum value, which may be 10 seconds. In a third rule, when a particular "hold" condition is detected, the sample time will not be changed between consecutive iterations of the state controller module 136, and in a fourth rule, if "teleport" activity (i.e., changed location, but zero velocity) is detected, the sample time will be set to the minimum value.

In the rightmost set of trigger conditions (i.e., when no triggers have changed), two particular rules are defined. In a first rule, if no triggers have changed between consecutive cycles of the state controller module 136, sample time will be increased by 10 seconds. This condition may occur, for example, when a user has set their mobile device 102a-102n on a desk, or in some other like condition. In the second rule, when the mobile device 102a-102n is in a static state, such as might occur overnight, or when the mobile device 102a-102n has been sitting on the desk or a table for many hours, the sample time is increased by a more substantial increment of four times its previous value.

Another condition that may occur is the recognition by the state controller module 136 that mobile device 102a-102n is communicatively coupled to a local area network (LAN) via a WiFi connection. In this case, the state controller module 136 may recognize or otherwise be directed not to collect large amounts of cellular data when data is actually being communicated via a WiFi communication path. In cases where the WiFi trigger is not enable, when a user is at home or in an office building, for example, motion of the mobile device 102a-102n or significant changes in cellular signal strength may cause the ASDC methodology to sample an undesirable amount of uninteresting data. In these cases, even if the location of the mobile device 102a-102n or WiFi connection is later identified to post-process and remove the undesirable, uninteresting data, benefits are realized when the data is not collected at all.

FIG. 5C is a representative embodiment of sampled parameters; any one or more of which may be captured in the QoS data collection state 144 of the state controller module 136 of FIG. 4. The sampled parameters in FIG. 5C are presented in a table format and identified as Table 3. In Table 2, several dozen parameters are identified, which will be recognized by one of skill in the art as having particular value in the analysis of quality of services delivered via a wide area network 6. When the parameters of Table 3 are captured, the data is stored in a memory of mobile device 102a-102n for immediate or later communication to the data collection portion 108a of computing server 108. In some cases, the sampled parameters are sent as raw text data, and in other cases, the sampled parameters are processed prior to communication.

Figure 6A:
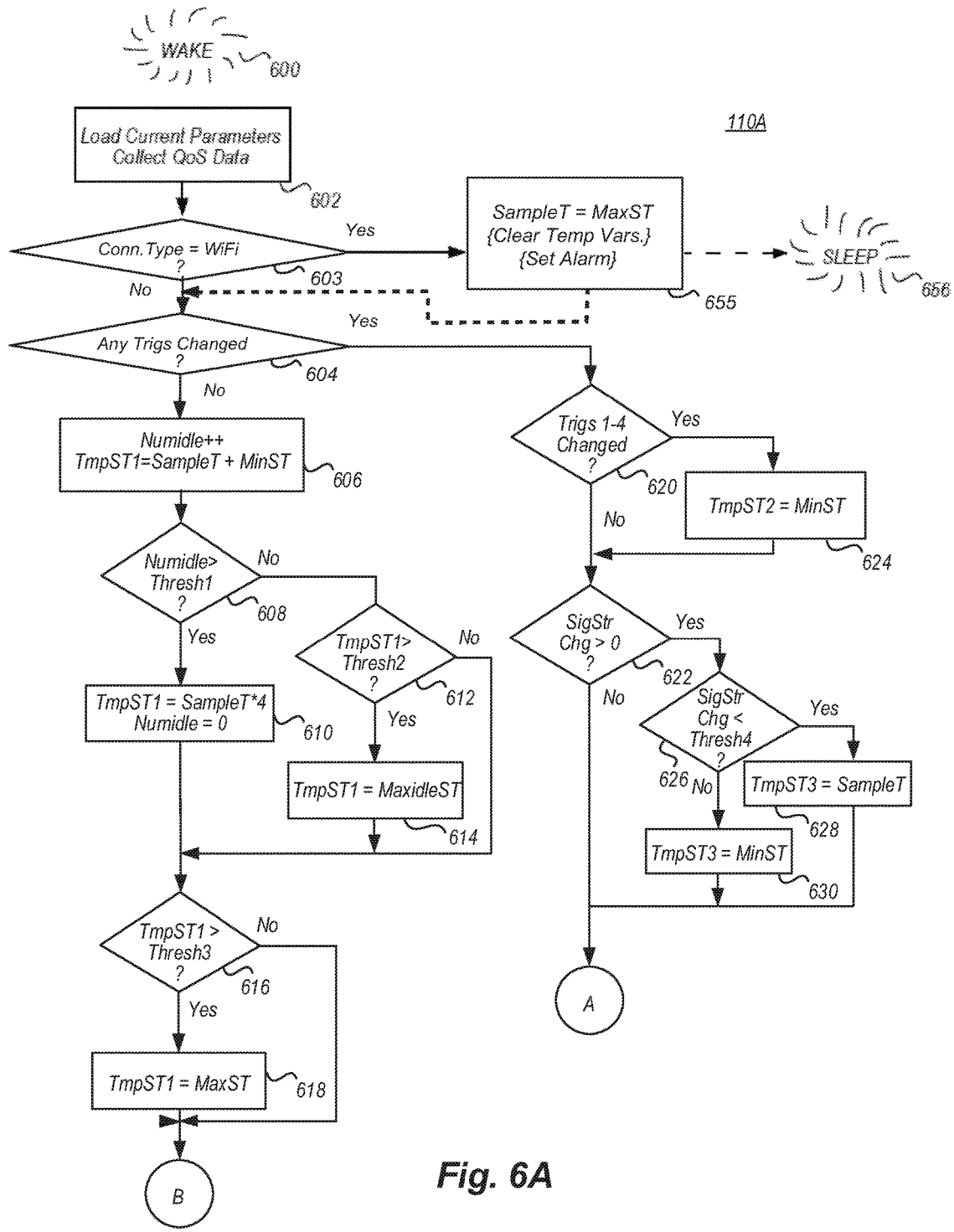
FIG. 6A is a first portion of a flowchart of the ASDC test methodology of FIG. 4 in more detail.
Figure 6B:
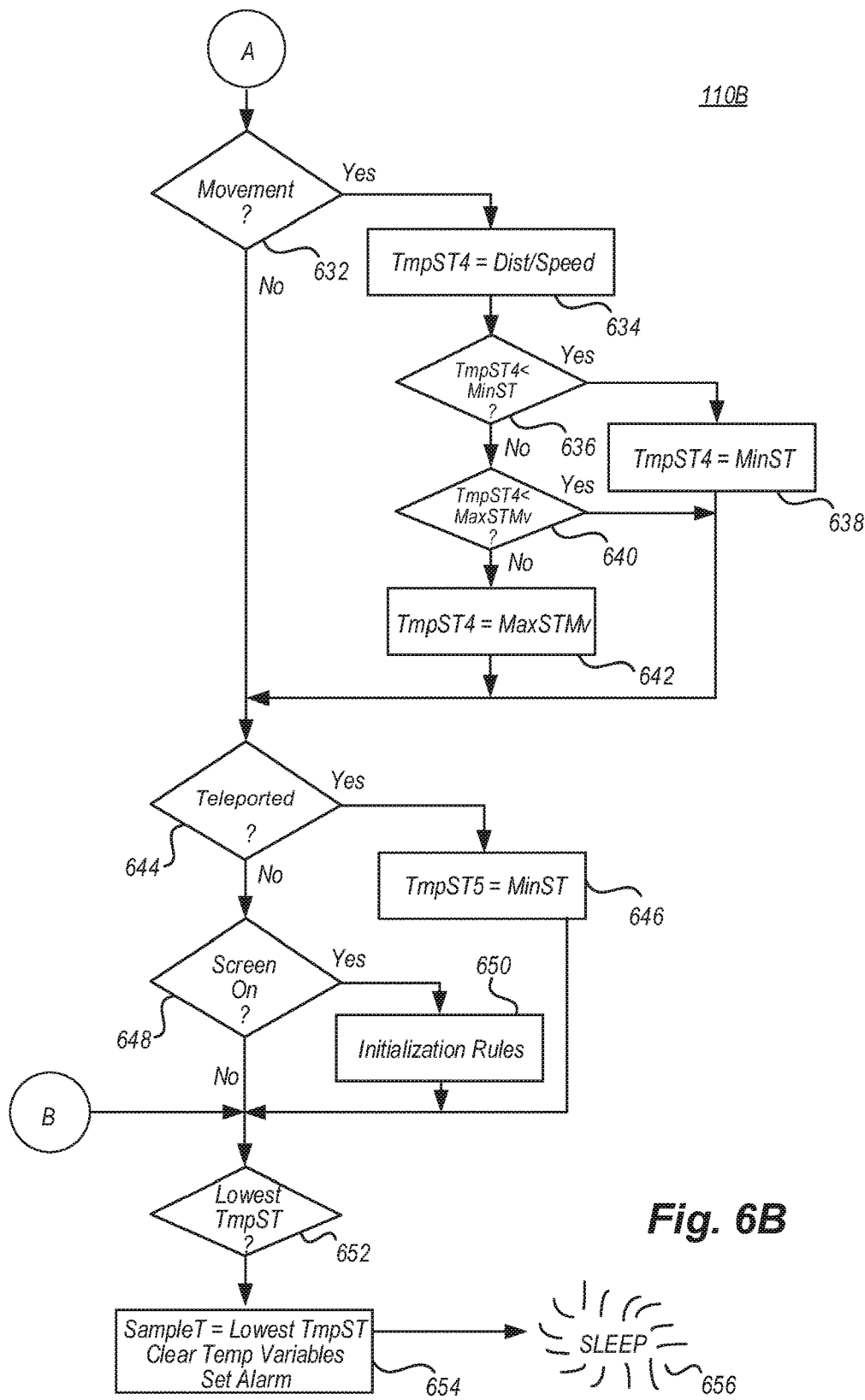
FIG. 6B is a second portion of a flowchart of the ASDC test methodology of FIG. 4 in more detail.

FIG. 6A is a first portion of a flowchart of the ASDC test methodology 110A of FIG. 4 in more detail; FIG. 6B is a second portion of the flowchart of the ASDC test methodology 110A of FIG. 4 in more detail. The two flowcharts 110A and 110B cooperate to describe one non-limiting embodiment of the ASDC test methodology 110 described in the present disclosure.

Along the lines of FIGS. 6A and 6B, an implementation of and ASDC test methodology has been constructed with a host application and a background service. The background service is constructed around a state controller, which is subject to several constraints as described herein. Some constraints governing a non-limiting implementation were imposed by a host operating system (O/S) executing on the mobile device 102a-102n and the available application programming interface (API) calls that are exposed. In this regard, the state controller in at least one implementation has been built using the ANDROID SERVICE COMPONENT, which sets forth an operational paradigm to perform background execution when the host application is not in focus. Also included in the implementation is a methodology that dynamically and flexibly strikes a balance between collecting QoS data and reducing the effect of the QoS data collection activity on battery usage and on the overall performance of the device. The implementation incorporates a "sleeping" service design, which allows the device to enter sleep or even deep sleep between state controller iterations by scheduling sample times using hardware-based timers and selected API's that expose the alarm functions of the timers.

To add configurability to the ASDC test methodology, the activation of triggers may be programmatically selectable or user selectable via the ASDC software application. Similarly, the rules applied by the state controller may also be adjustable. This configurability is intended to find a commercially acceptable tradeoff between capturing device and wireless network key performance indicators (i.e., QoS data) and saving power and processing unit cycles by remaining dormant. For each trigger, a host application or Web service API provides the selection of which trigger is active or inactive. An inactive trigger will simply not factor into the decision of activating a relevant rule. In some instances, the parameter threshold for the trigger is modifiable. Additionally, a common or shared infrastructure can be used to select triggers and to adjust the rules used to compute the sample time in the state controller. As a result, the data sample rate can be made to increase or decrease at varying rates in response to an activated trigger.

Using selectable triggers and adjustable rules also enables the remote computing server, host application, or state controller the ability to perform relaxed to aggressive data sampling related to targeted data parameters, and thus to particular device or network conditions. New triggers and rules can be created dynamically from an external agent based on historical factors and current factors such as geo-location, data traffic, time of day, and any other factors.

New trigger selections and adjusted rules may then be uploaded to the mobile device using the infrastructure described herein.

In FIG. 6A, processing begins at 600 when the background service is initiated or otherwise woken up. At 602, current input parameters associated with various aspects of a mobile device are loaded. In one embodiment, the input parameters may correspond to some or all of the input parameters identified in Table 1 (FIG. 5A). Also at 602, QoS data is collected. The QoS data collected may include one or more of the parameters identified in Table 3 (FIG. 5C).

At 603, the connection type of the mobile device is evaluated. If the connection type is determined to be WiFi, or if it is determined in other ways that the mobile device is communicating data over a non-cellular connection, then it may be beneficial to change the current value of sample time. In this case, optional processing at 655 is performed.

At 655, the state controller has determined or otherwise been directed that various QoS measurements may have little value because data is being communicated by the mobile device over a WiFi or other non-cellular connection. In these cases, the current value of sample time, "SampleT," will be loaded with a maximum sample time, "MaxST." Optionally, in some embodiments, after making such determination and loading the current sample time variable, other temporary variables are cleared, an alarm is set, and the background service enters a sleep mode at 656. In these embodiments, the background service will remain in the sleep mode until the alarm time (i.e., SampleT) expires or some other condition restarts the state controller. In other alternative embodiments, after setting the SampleT variable to the maximum sample time, processing proceeds at 604.

If the connection type is not WiFi, or in some optional embodiments where processing continues even during a WiFi connection, processing continues to 604 wherein a state controller determines whether any input triggers have changed. In view of Table 1, the state controller may individually look at each trigger by comparing the fresh (i.e., current) value of the trigger with a stale (i.e., previous) version of the corresponding trigger. Alternatively, all of the triggers may be combined such that collectively, a determination is made of whether or not any triggers have changed. If it is determined that at least one trigger has changed, processing advances to 620. Conversely, if it is determined that no triggers have changed, processing falls to 606.

At 606, a particular variable, "NumIdle," is incremented. The NumIdle variable keeps track of the number of consecutive times that the state controller sequence has passed through and no triggers have changed. A first temporary sample time variable, "TmpST1," is loaded with the current value of sample time, "SampleT," plus a minimum sample time value, "MinST." Processing at 606 may be according to the third set of trigger conditions of Table 2 (FIG. 5B), i.e., when no triggers have changed. In this way, if no triggers have changed after a previous sample time of 10 seconds, for example, the new sample time will be incremented to 20 seconds. If no triggers have changed after this new period of 20 seconds, the new sample time will be increased to 30 seconds. This processing at 606 will occur when the state controller determines that no triggers have changed at 604.

The processing at 606 that increments sample time is interrogated at 608. At 608, the NumIdle variable is compared to a first threshold, "Thresh1," which may be set to four. Other values for Thresh1 are also considered, however, in the present embodiment, if four consecutive passes through the state controller have each indicated that no triggers have been changed, then processing falls through to 610. At 610, the state controller updates the TmpST1 temporary sample time variable by multiplying the current sample time, SampleT by four. In this way, the background service will sleep four times longer on its next pass than it did on its most recent pass. In this case, the NumIdle variable is also reset to zero. Alternatively at 608, if any of the previous four consecutive passes through the state controller has indicated a trigger has changed, then the NumIdle variable will not yet have exceeded Thresh1, and processing will continue to 612.

At 612, the value of TmpST1, which has been incremented, is compared to a second threshold, "Thresh2." In some embodiments, the second threshold is set to 300 seconds (i.e., 5 minutes). Since sample time may have any previous value when a particular iteration through the state controller detects that no triggers have changed, the sample time may previously have been set to any other value. Alternatively, the state controller may have detected that the mobile device has been idle for a long time, and the sample time has grown large. In this case, when the threshold is exceeded, the TmpST1 temporary sample time variable is set to "MaxIdleST." In one embodiment, MaxIdleST is initialized to 300 seconds (i.e., 5 minutes), but in other cases different values are considered.

Processing at 616 is entered after the completion of processing at 610, after the completion of processing at 614, or if TmpST1 did not exceed Thresh2 at 612. At 616, TmpST1 is compared to a third threshold, "Thresh3," which in the present embodiment is set to 900 seconds (i.e., 15 minutes), but in other cases different values are considered.

If the third threshold is exceeded, which may occur through extended periods of the mobile device being idle, processing falls to 618. At 618, the first temporary sample time variable, TmpST1, is set to the maximum sample time, "MaxST." In some cases, MaxST is set to 900 seconds. Following the processing at 618, or if the third threshold is not exceeded, processing progresses to 652 (FIG. 6B).

At 620, which is entered from an affirmative determination that at least one trigger has changed and 604, particular triggers are interrogated individually or collectively. The particular triggers, which in processing at 620 include the first four triggers of Table 1, merely look to see if there has been any change between the previous iteration of the state controller and the current iteration of the state controller. If any change is detected, it is determined that a significant event has occurred, and QoS data samples should be collected rather quickly. Accordingly, at 624, a second temporary sample time variable, "TmpST2" is set to MinST. After setting TmpST2 at 624, or if none of the first four triggers has changed, processing falls to 622.

At 622 a current value of signal strength is compared to a previous value of signal strength. If no change in signal strength is detected, processing falls to 632 (FIG. 6B). Conversely, if a change in signal strength has been detected, the magnitude of the change in signal strength is compared to a fourth threshold value, "Thresh4." In one embodiment, Thresh4 is set to 10 dBm, but other values could also be chosen. If the signal strength change is less than Thresh4, the change is not recognized as significant, and instead the change is reasonable under normal operating conditions. Accordingly, in this case, processing falls to 628 where a third temporary sample time variable, "TmpST3," is set to the current value of sample time, SampleT. In this way, the background service will sleep or otherwise remain idle for the same time as its most recent iteration. On the other hand, if the change to signal strength does cross Thresh4, then processing falls to 630 where TmpST3 is loaded with the MinST value. After TmpST3 is loaded at 628 or 630, processing falls to 632 (FIG. 6B).

In FIG. 6B, the analysis of processing begins at 632. At 632, the state controller determines if the mobile device is in motion. If the mobile device is not in motion, processing falls to 644. Alternatively, processing falls to 634, and a fourth temporary sample time value, "TmpST4," is loaded with a particular calculation. In the particular calculation a certain distance of movement, "Dist" is set to 50 meters. The value of Dist is divided by the current speed, "Speed," of the mobile device. Since the value of Dist is measured in meters, and since the speed of the mobile device is measured in meters per second, dividing Dist by Speed will result in a value measured in seconds. Recognizing exemplary cases, if the mobile device is moving at a speed of 5 m/s, which may indicate a person on a bicycle, or running, TmpST4 will be set to a value of, or otherwise incremented by, 10 seconds. On the other hand, if the person is walking with their mobile device the speed may indicate 1.66 m/s, and in this case, TmpST4 will be set to a value of, or otherwise incremented by, 30 seconds. Processing from 634 falls to processing at 636.

At 636, the state machine controller considers the updated TmpST4 variable, and if this fourth temporary sample time falls below MinST, then the fourth temporary sample time is set to MinST at 638, and processing continues to 644. Alternatively, if TmpST4 is the same or greater than MinST, then TmpST4 is compared to a new threshold at 640. The new threshold is the maximum amount of time allowed when the device is in motion, "MaxSTMv." If TmpST4 crosses the MaxSTMv threshold, then TmpST4 is set to MaxSTMv at 642 and processing falls to 644. Alternatively, if TmpST4 does not cross the MaxSTMv threshold, then TmpST4 retains its previously set value, and processing falls to 644.

At 644, a teleport trigger is interrogated. The teleport trigger indicates whether or not the mobile device has moved since the most recent pass through the method even though no motion is detected. If the mobile device appears to have teleported, then it is believed that valuable QoS data may be generated. In this case, a fifth temporary sample time variable, "TmpST5," is set to MinST at 646 and processing falls to 652. Alternatively, processing at 648 determines if a "Screen On" condition has been triggered. If the Screen On condition is triggered, then a set of initialization rules are performed at 650.

The initialization rules at 650 may reset the entire background service. One mechanism that may be used to trigger the Screen On condition includes a particular key sequence or some other user input. The key sequence may be detected via the ASDC software host application or in some other way.

At 652, processing determines which of all of the temporary sample time variables (i.e., TmpST1, TmpST2, TmpST3, TmpST4, and TmpST5) has the lowest value, and processing falls to 654.

At 654, the SampleT variable is updated to the temporary sample time variable that has the lowest value. In this way, it is recognized, that a plurality of different triggers, and a plurality of different rules applied to the triggers, may each act independently to set up or otherwise adjust a particularly temporary sample time variable. If the rules and conditions in any particular case indicate less valuable or less useful QoS data at a current time, then a temporary sample time variable is increased, which are conditions to allow the background service to sleep for a longer period of time. On the other hand, if the rules and conditions in a certain case indicate more valuable or more useful QoS data at a current time, then that associated temporary sample time variable is reduced. Near the end of processing in the state controller, all of the temporary sample time variables are interrogated, and the lowest value is selected for use in loading the variable SampleT.

Also at 654, the temporary values are all cleared, and the value SampleT is loaded into an alarm. The background service will then enter a sleep mode at 656 and remain in the sleep mode until the alarm time (i.e., SampleT) expires or when some other condition restarts the state controller. When the background service awakes or is otherwise started, processing begins again at 600.

In the present disclosure, various aspects of an adaptive speed data collection (ASDC) test methodology have been described in context of the collection of QoS data for a wide area network, such as a mobile cellular network. Certain aspects include a broad picture of the system as in FIG. 2, and other aspects are described with respect to a particular mobile device 102a. Still other aspects are described in a block diagram representing portions of a computing server 108, a user mode ASDC host software application 130, and an ASDC background service 132. Along these lines, particular triggers and rules were also discussed alongside these embodiments in context of the triggers and rules definitions in Table 1 (FIG. 5A) and Table 2 (FIG. 5B). Turning back to the rules in Table 2, various graphs are now presented that illustrate an adaptive data speed. In this respect, the particular mobile device 102a-102n will sleep before a certain amount of time (i.e., a "sample time") between operations that collect QoS data.

FIGS. 7A-7D are now presented. The figures include particular data from an exemplary embodiment. The data and illustrations are not limiting. Instead, the data and illustrations indicate how one implementation of an ASDC test methodology operate to reduce battery usage, reduce processing unit cycles, and provide other benefits.

FIG. 7A is a representative graph of sample time changing under a no-triggers condition.

When none of the triggers are changing, the state controller adds kINCREASE_SAMPLE_TIME_INCREMENT to the current Sample Time. If at any point the new calculated Sample Time exceeds kMAXIMUM_NOT_MOVING_SAMPLE_TIME, then Sample Time is set to kMAXIMUM_NOT_MOVING_SAMPLE_TIME. In FIG. 7A, this is indicated as the "NC Max" value. If the state controller determines at any point in a series of state controller cycles that none of the triggers have changed for four Sample Times, the current Sample Time is multiplied by four. As time passes, if all of the triggers remain unchanging, then Sample Time is again multiplied by four, and so on. In this way it is shown in FIG. 7A that Sample Time increments first by increments of 10 seconds. Then, after four consecutive sequences of 10-second increments, Sample Time is multiplied by four, which results in Sample Time being set to 160 seconds. If or when the calculated Sample Time exceeds kMAXIMUM_STATIC_SAMPLE_TIME, it is set to kMAXIMUM_STATIC_SAMPLE_TIME. In FIG. 7A, this condition is illustrated as "Static Max." As time passes, whenever a change to a trigger is detected, the Sample Time variable will be set accordingly. Then, the next time a no-trigger condition is detected, the state controller will restart the Sample Time increases at 10 seconds. In FIG. 7A, the following values were used:

kINCREASE_SAMPLE_TIME_INCREMENT=10 seconds.

kMAXIMUM_NOT_MOVING_SAMPLE_TIME=5 minutes.

kMAXIMUM_STATIC_SAMPLE_TIME=15 minutes.

FIG. 7B is a representative graph of sample time changing when a mobile device is in a device-moving condition. The mobile device determines that it is moving from interrogating a GPS to determine a GPS Speed value. In FIG. 7B, for different values, V1-V4, are indicated. The GPS speed variable has the unit meters per second. From the GPS speed variable, the state controller calculates Sample Time by dividing a kDESIRED_SAMPLE_DISTANCE constant by the current GPS speed value. The Sample camp time calculation has both floor and ceiling values set by kMINIMUM_STATIC_SAMPLE_TIME and kMAXIMUM_STATIC_SAMPLE_TIME, respectively.

In FIG. 7B, the following values were used:
kDESIRED_SAMPLE_DISTANCE=50 meters.
kMINIMUM_SAMPLE_TIME=10 seconds.
kMAXIMUM_MOVING_SAMPLE_TIME=5 minutes.

FIG. 7C is a representative graph of sample time changing under a trigger-activated condition. When any one of the triggers is changing, which is indicated by "TC" in FIG. 7C, and if the mobile device is also not moving, then Sample Time is set to kMINIMUM_SAMPLE_TIME. If it any time the mobile device starts to move, the state controller will revert to the rule for a moving device, which is illustrated in FIG. 7B.

In FIG. 7C, the following value was used:
kDESIRED_SAMPLE_DISTANCE=50 meters.
kMINIMUM_SAMPLE_TIME=10 seconds.

FIG. 7D is a representative graph of sample time held fixed under a hold condition. In at least some of the present embodiments, the state controller implements a "hold" rule that will keep the Sample Time at the same value as a previous Sample Time. In at least some of these embodiments, the hold rule is only applied when the signal strength has changed but the magnitude of the change is reasonably small. In the embodiment of FIG. 7D, the hold rule is applied when a signal strength changes detected. At a first trigger condition, TC, the signal strength change exceeded the threshold of 10 dBm, and the Sample Time was reduced from 90 seconds to 60 seconds. In subsequent passes through the state controller, the threshold was not met, and the hold rule was applied. Accordingly, through the subsequent passes, Sample Time remains constant.

Non-limiting embodiments of computing devices such as computing server 108 and mobile devices 102a-102n are referenced and described herein, but certain details of such devices are not described for the sake of brevity and simplicity. The computing devices are understood to include operative hardware found in a conventional computing apparatuses such as one or more central processing units (CPU's), volatile and non-volatile memory, serial and parallel input/output (I/O) circuitry compliant with various standards and protocols, wired and/or wireless networking circuitry (e.g., a communications transceiver), and the like.

Along these lines, the terms processor, processing unit, and the like are used in the present disclosure to refers to one or more processing units individually, shared, or in a group, having one or more processing cores (e.g., execution units), including central processing units (CPUs), digital signal processors (DSPs), microprocessors, micro controllers, state machines, state controllers, and the like that execute instructions. For example, as used herein, a processing unit may include all or any portions of a host applications processor, a baseband processing unit, a security module processing unit, and other processing units in a single structure or a distributed structure.

In the present disclosure, various software applications, applets, functions, and the like are discussed. The software discussed herein is formed of processor-executable instructions stored in memory logic. The memory logic may be arranged in one configuration or another. The memory logic may be arranged to store software instructions, data, or software instructions and data. As known by one skilled in the art, the memory logic comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

In the alternative or in addition, the memory logic may be comprised as a non-transitory computer readable medium (CRM) wherein the CRM is configured to store instructions executable by a processor. The instructions may be stored individually or as groups of instructions in files. The files may include applications, functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

With respect to data stored in memory, the adaptive speed data collection (ASDC) test methodology applications and services may operate by converting the collected quality of service (QoS) data, generated data, or other data into a markup language such as XML. Alternatively, or in addition, the ASDC applications and services may copy files or direct other applications or services to copy files. The copied files may be converted to a markup language, compressed, and combined (e.g., ZIP file, TAR file, etc.) into a small, easily transportable file or set of files. In this manner, particular sets of quality of service data can be created and more easily copied to a data collection server.

Buttons, keypads, computer mice, memory cards, serial ports, bio-sensor readers, touch screens, and the like may individually or in cooperation be useful to a user of mobile devices 102a-102n. The input devices may, for example, input control information into the mobile devices 102a-102n. Displays, printers, memory cards, LED indicators, audio devices (e.g., speakers, piezo device, etc.), vibrators, and the like are all useful to present output information to a mobile device user. In some cases, the input and output devices are electronically coupled to the CPU or other operative circuitry. In other cases, the input and output devices pass information via one or more communication ports (e.g., RS-232, RS-485, infrared, USB, and the like.)

In the present disclosure the term "mobile device" is used to indicate a computing device capable of communicating through a wide area wireless communications network such as a cellular mobile device network, a satellite mobile device network, or some other mobile device network. It is understood that the device capable of such communication may itself be mobile or otherwise portable. Conversely, the device capable of such communication may be temporarily or permanently stationary. As used herein, a mobile device may be embodied as cellular phone, a smartphone, a tablet, a laptop computer, a wearable computer, a motor vehicle computer, a stationary piece of wireless communications equipment that is integrated or otherwise associated with another data producing or data gathering device, or some other like device configured to communicate via a wide area network. The term mobile device as used herein is not intended to be limiting; instead, the term is used to help a reader understand various embodiments of the disclosure.

The term "logic," as used herein, may refer to circuitry, software, or a combination of circuitry and software.

As used herein, the term "module" refers to an electronic circuit, a processor (e.g., shared, dedicated, group, single core, multicore, or the like) and memory operative to execute one or more software or firmware programs, an application specific integrated circuit (ASIC), a combinational logic circuit, or some other individual or cooperative coupling of suitable components (either hardware or software) that provides the functionally described with respect to the module.

Any flowcharts presented herein, even unconventional flowcharts wherein blocks are illustrated to communicate data, illustrate processes that may be used by embodiments of the devices described herein to load a prioritized AID routing table. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. Along these lines, particular terms associated with software design and development have the same meaning as commonly understood by one of ordinary skill in the software arts. For example, the terms "minimum," "maximum," and the like are understood to be floor or ceiling values set in a software context.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mobile device, comprising:
    a memory means for storing at least two sets of software instructions, the at least two sets of software instructions including a first set of software instructions organized as a host application and a second set of software instructions organized as a background service;
    a processing means for executing the at least two sets of software instructions;
    an interface arranged to pass input variables from the memory means to the background service; and
    a timing means for interrupting the processing means when a first time duration expires, the first time duration corresponding to a sample time value, wherein the second set of software instructions organized as the background service direct the processing means to:
    collect quality of service (QoS) data associated with a certain wide area network;
    determine a new sample time that is increased by a first amount when an absence of movement of the mobile device is determined and that is increased by a second amount when a continued absence of movement of the mobile device is determined, the second amount being larger than the first amount;
    load the timing means with the new sample time value; and
    suspend operation of the background service until the timing means interrupts the processing means after a second time duration corresponding to the new sample time value expires.

2. A mobile device according to claim 1, further comprising:
   a transceiver means for sending collected QoS data to a remote data collection server.

3. A mobile device according to claim 2, further comprising:
   a user interface means for presenting information representing at least some of the collected QoS data in cooperation with the first set of software instructions organized as the host application.

4. A mobile device according to claim 3 wherein the transceiver means is also for receiving control information from a remote data control server, the control information arranged to modify rules that are applied to asserted triggers, the new sample time value based on said rules and asserted triggers.

5. A mobile device according to claim 4 wherein the asserted triggers include at least one of a cell identifier, a call state, a network type, a connection type, a signal strength value, a mobile device movement value, a mobile device user activity value, and a screen-on value.

6. A mobile device according to claim 5 wherein to determine the new sample time value, the second set of software instructions organized as the background service further directs the processing means to load the new sample time value based on at least one of:
   a change to the cell identifier;
   a change to the network type;
   a change to the connection type;
   a change in signal strength that exceeds a predetermined power ratio value;
   a user activity of the mobile device; and
   a change in screen state of the mobile device.

7. A mobile device according to claim 1 wherein the first set of software instructions organized as the host application configure the processing means to direct operations of the second set of software instructions organized as the background service.

8. A mobile device system, comprising:
   a data collection server arranged to communicate with a mobile device; and
   a data control server arranged to direct at least some operations of the mobile device, wherein the mobile device is arranged to execute a host application and a background service, the mobile device having a timer that triggers execution of background service operations after expiration of a variable sample time value, the background service operations including:
   collecting quality of service (QoS) data associated with a certain wide area network, the QoS data communicated from the mobile device to the data collection server;
   receiving rule information passed from the data control server;
   updating the variable sample time value based on the rule information, wherein the variable sample time value is increased by a first amount when an absence of movement of the mobile device is determined and wherein the variable sample time value is increased by a second amount when a continued absence of movement of the mobile device is determined, the second amount being larger than the first amount;
   loading the timer with the updated variable sample time value; and
   suspending operation of the background service until the timer expires.

9. A mobile device system according to claim 8 wherein the data collection server and the data control server are configured in a single computing server.

10. A mobile device system according to claim 8 wherein the data control server is arranged to send updated rule information to the mobile device.

11. A mobile device system according to claim 8 wherein the data collection server is arranged to concurrently communicate with a plurality of mobile devices and wherein the data control server is arranged to direct at least some operations of the plurality of mobile devices.

12. A mobile device system according to claim 8 wherein the background service operations of the mobile device are transparent to a user of the mobile device.

13. A mobile device system according to claim 8 wherein the mobile device includes a user interface, and wherein the host application is arranged to present information representing at least some of the collected QoS data via the user interface.

* * * * *